(12) United States Patent
Gaukel

(10) Patent No.: US 6,604,439 B2
(45) Date of Patent: Aug. 12, 2003

(54) STEERING COLUMN SUPPORT ASSEMBLY

(76) Inventor: Patrick D. Gaukel, 466 Cranson Rd., Bronson, MI (US) 49028

( * ) Notice: Subject to any disclaimer, the term of this patent is extended or adjusted under 35 U.S.C. 154(b) by 30 days.

(21) Appl. No.: 09/846,818

(22) Filed: May 1, 2001

(65) Prior Publication Data

US 2002/0020245 A1 Feb. 21, 2002

Related U.S. Application Data

(60) Provisional application No. 60/201,128, filed on May 2, 2000.

(51) Int. Cl.$^7$ ................................................. B62D 1/18
(52) U.S. Cl. ........................................................ 74/493
(58) Field of Search ........................................... 74/493

(56) References Cited

U.S. PATENT DOCUMENTS

| | | | | |
|---|---|---|---|---|
| 3,693,997 | A | * | 9/1972 | Dreyer ........................ 280/775 |
| 4,195,535 | A | * | 4/1980 | Broucksou ............... 403/109.5 |
| 4,495,834 | A | * | 1/1985 | Bauer et al. ................. 280/775 |
| 4,607,540 | A | * | 8/1986 | Kinoshita et al. .............. 74/493 |
| 4,649,769 | A | * | 3/1987 | Venable ...................... 403/105 |
| 4,655,475 | A | * | 4/1987 | Van Gelderen .............. 180/78 |
| 4,656,888 | A | | 4/1987 | Schmitz |
| 4,682,787 | A | * | 7/1987 | Ruhter et al. ................ 180/334 |
| 4,752,085 | A | * | 6/1988 | Yamamoto .................. 280/775 |
| 4,815,765 | A | | 3/1989 | Peterson |
| 4,936,161 | A | * | 6/1990 | Polando ................. 188/196 M |
| 5,131,287 | A | | 7/1992 | Stromberg |
| 5,180,955 | A | * | 1/1993 | Karidis et al. ............ 310/49 R |
| 5,259,264 | A | | 11/1993 | Bodin et al. |
| 5,427,411 | A | * | 6/1995 | Iwasaki et al. .............. 280/777 |
| 5,570,610 | A | | 11/1996 | Cymbal |
| 5,606,891 | A | | 3/1997 | Tisell et al. |
| 5,931,501 | A | | 8/1999 | Baumann et al. |
| 6,039,350 | A | | 3/2000 | Patzelt et al. |
| 6,189,405 | B1 | * | 2/2001 | Yazane ........................ 180/444 |

FOREIGN PATENT DOCUMENTS

EP          1 203 711 A2    *    8/2001

* cited by examiner

*Primary Examiner*—David A. Bucci
*Assistant Examiner*—Julie K. Smith

(57) ABSTRACT

A support assembly for a steering column includes a housing interconnected to a lower end of the steering column by a first linkage member. The lower end of the steering column is also interconnected to one end of the housing by a second linkage member. A third linkage member interconnects the upper end of the steering column to the same end of the housing as is connected to the second linkage member. The relative positions of the second and third linkage members, and as a result, the orientation of the steering column, is maintained by a releasable lock assembly extending through the end of said housing as well as the end portions of the second and third linkage members.

20 Claims, 8 Drawing Sheets

STEERING COLUMN SUPPORT ASSEMBLY

This application claims the benefit of provisional application No. 60/201,128, filed May 2, 2000.

BACKGROUND OF THE INVENTION

1. Field of the Invention

This invention relates generally to articulated mechanical structures and particularly to adjustable steering columns.

2. Discussion of the Related Art

Adjustable steering columns have been in existence for some time. Early devices were based on a simple pivot joint between the upper and lower steering column housings, the steering column shafts interconnected by a universal joint. Later systems employed complex arcuate and swinging arm and adjustable links. For example, see U.S. Pat. No. 4,656,888 assigned to Kloeckner-Humboldt-Deutz AG of Germany and U.S. Pat. No. 5,259,264 assigned to AB Volvo of Sweden.

The device shown in the Volvo '264 patent provides an adjustable steering column using a series of swinging arms. The position of the arms can be adjusted using a pair of levers pivotally joined to each other by means of a pivot pin. A control cable from an actuating pedal has a wire joined to the opposite end of one of the levers. When the pedal is depressed, the levers are moved towards each other which compress a spring package applying pressure to the joints of the arms, and permit the steering column to move.

Another form of steering column adjustment mechanism is generally illustrated in U.S. Pat. Nos. 5,131,287 and 5,606,891. Each of these devices are based upon a bracket having elongated slots in which pins translate to telescopically adjust the steering column. Tilt arrangement is provided by a second bracket within the first wherein one of the pins is also permitted to translate vertically. The ends of the pins within the slots are fixed by a friction with the brackets, the pressure exerted by a "power means" such as a hydraulic cylinder or other actuator mechanism.

The complexity of the prior systems is the primary disadvantage of those systems. Complex tooling is necessary to form the convoluted and curved arms of the Volvo '264, which requires complicated static and dynamic analysis during the engineering stages as well as expensive tooling. With respect to the other described systems, complex locking mechanisms are required, where if pressure is lost, the position of the steering column is in jeopardy. It is a primary object of the instant invention to provide a steering column support assembly which is relatively straight forward and simple from an engineering standpoint, requires very little original tooling requirements; and is able to absorb crash energy to protect the operator.

SUMMARY OF THE INVENTION

A multi-bar linkage for a steering column, including a stationary housing, a first link interconnecting a lower end of the steering column to a distal point on the stationary housing relative to the steering column, a second link interconnecting the lower end of the steering column to a proximal point on the stationary housing relative to the steering column; and a third link interconnecting an upper end of the steering column to said proximal point on the stationary housing. A locking assembly is provided which extends through the stationary housing, an end of the second link, and an end of the third link, for fixing a relative position of the first, second, and third links relative to one another. The third link includes a longitudinal slot in an end coupled to the stationary housing, for allowing the third link to slide longitudinally relative to the stationary housing and change the steering column position relative to the stationary housing. The second link also includes a longitudinal slot in the end coupled to the stationary housing, for allowing the second link to slide longitudinally relative to the stationary housing and change the steering column position relative to the stationary housing.

BRIEF DESCRIPTION OF THE DRAWING FIGURES

DETAILED DESCRIPTION OF ONE EMBODIMENT OF THE INVENTION

Figure 6:
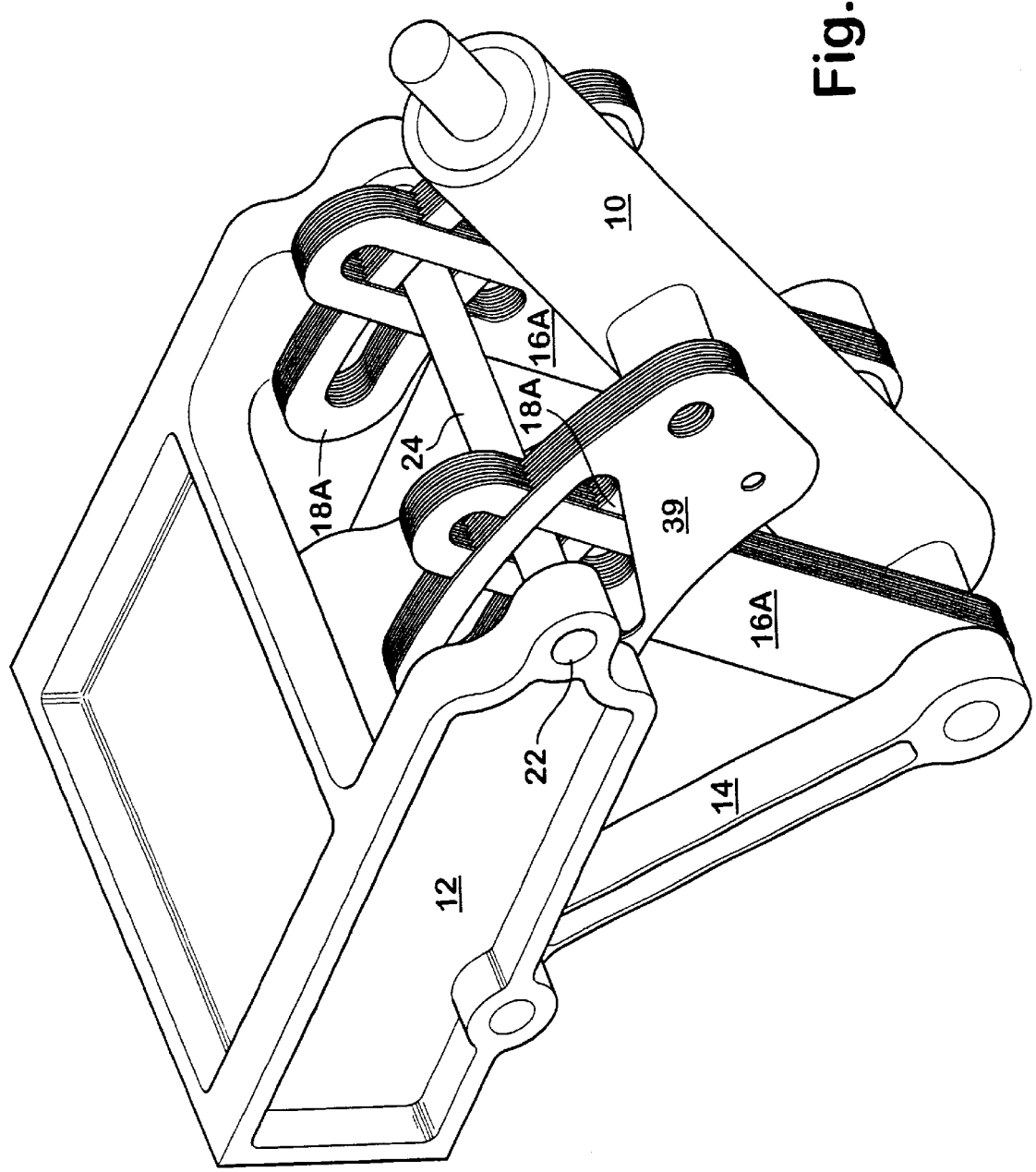
FIG. 6 is an isometric view of another embodiment of the invention.

For purposes of the following description, the terms "upper," "lower," "left," "rear," "front," "vertical," "horizontal" and derivatives of such terms shall relate to the invention as oriented in FIG. 6. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts. Specific dimensions and other physical characteristics relating to the embodiments disclosed herein are not to be considered as limiting, unless expressly stated otherwise.

In general, the concept is the use of a multi-bar linkage to adjust the telescope and tilt configuration of a steering column. In a first fixed configuration, shown in FIG. 1, steering column housing 10 is fixed with respect to a stationary housing 12 by a linkage plates 14 which interconnects the lower end of the steering column housing 10 to the stationary housing 12. Additionally, the lower end of the steering column housing 10 is connected by a second linkage plates 16 to an opposite end of the stationary housing 12. A third linkage plates 18 interconnects an upper end of the steering column housing 10 to the opposite end of the stationary housing 12 proximate the upper end of the second linkage plates 16.

Figure 1:
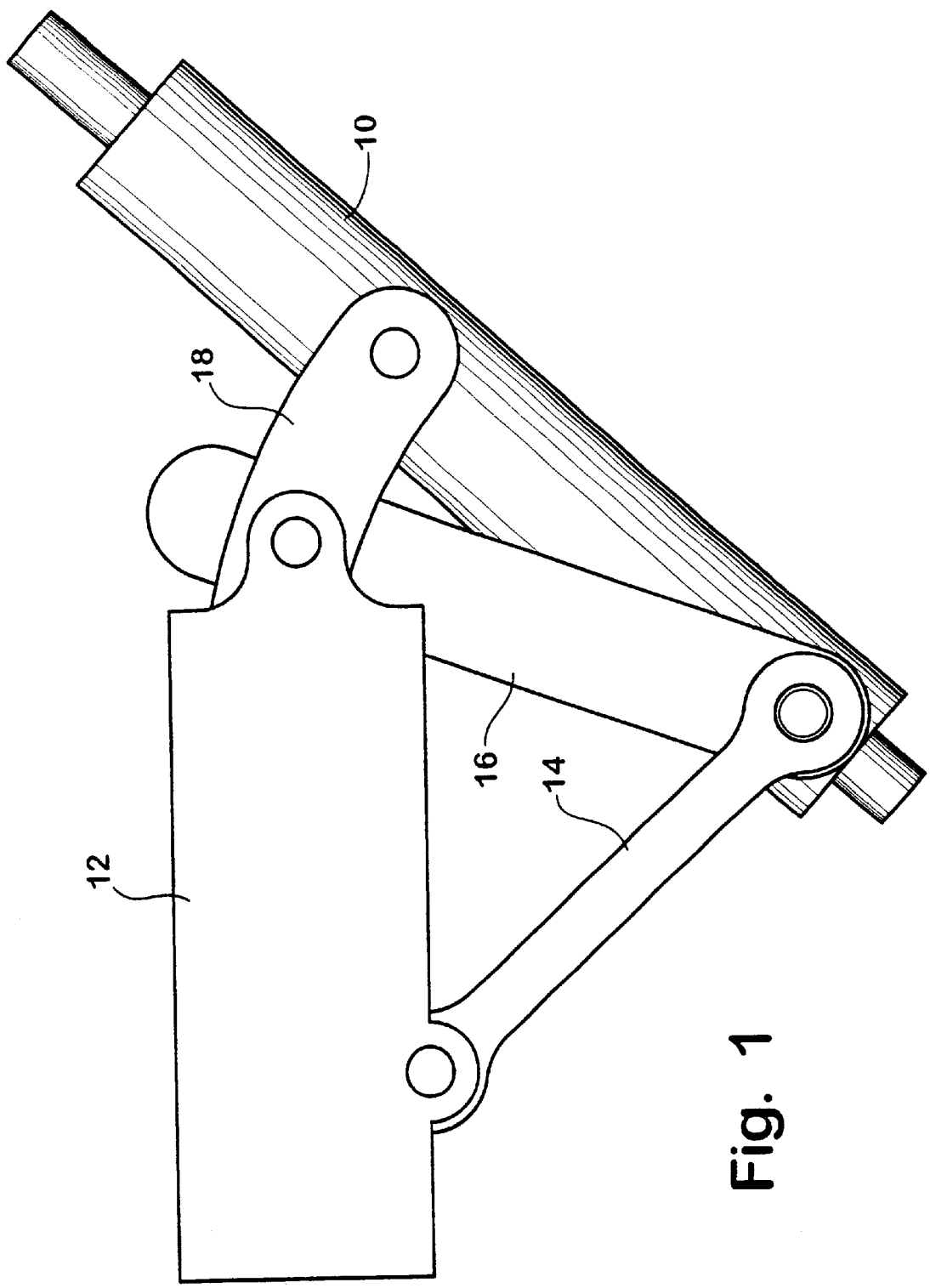
FIG. 1 is a side elevation of one form of a steering column support mechanism embodying the invention.
Figure 2:
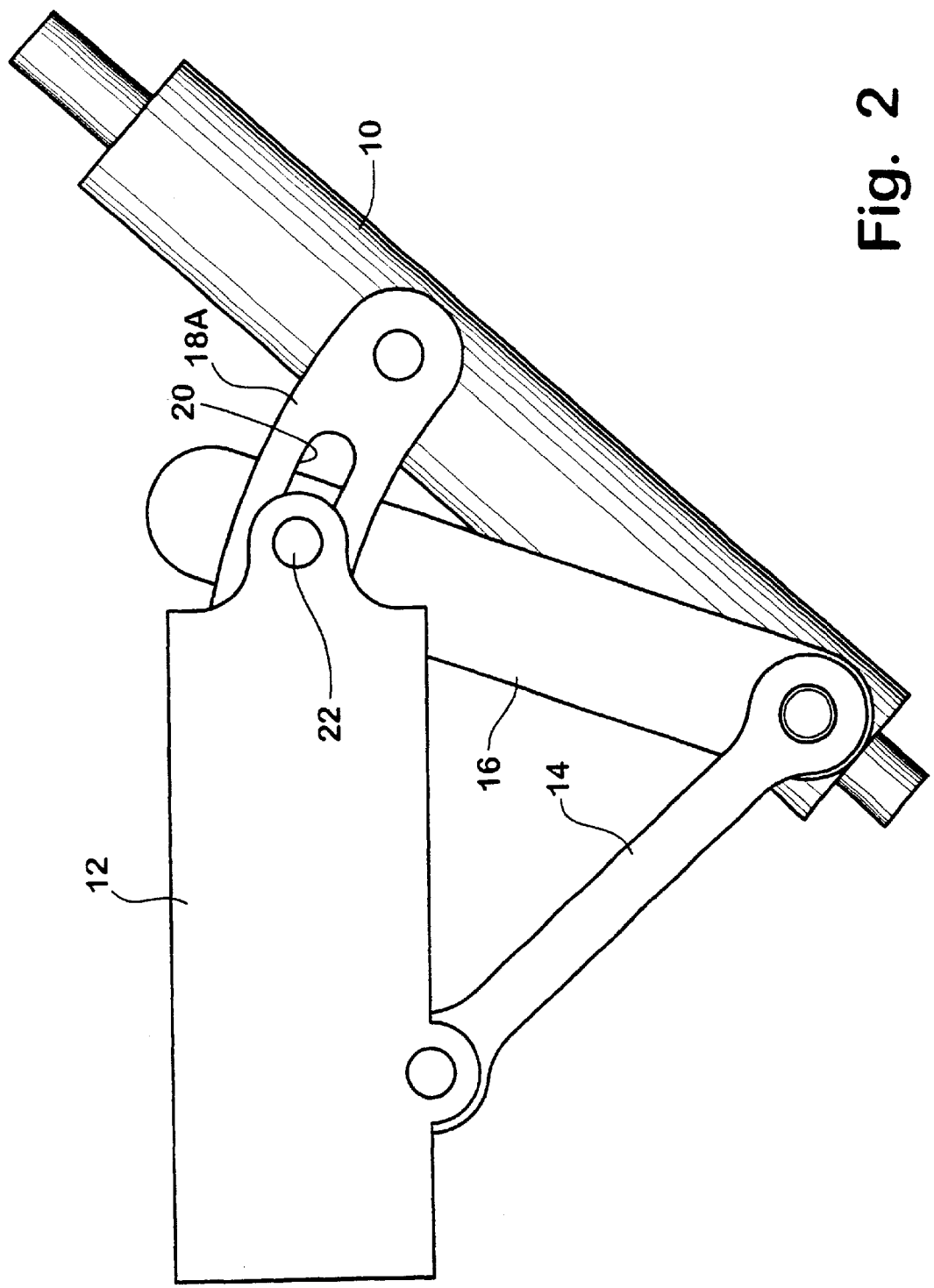
FIG. 2 is a side elevation of another form of a steering column support mechanism embodying the invention.

In another embodiment of the invention, tilting of the steering column is obtained by substantially the same configuration as shown in FIG. 1 with the exception that linkage plates 18 is replaced by linkage plates 18a which includes a longitudinal slot 20. The slot permits longitudinal movement of the linkage plates 18a with respect to a locking assembly 22 described in detail below. When the locking assembly 22 is engaged, the relative position of the linkage plates 18a is fixed. When released, of course, the steering column housing 10 can pivot about the lower end between a range of positions.

Figure 3:
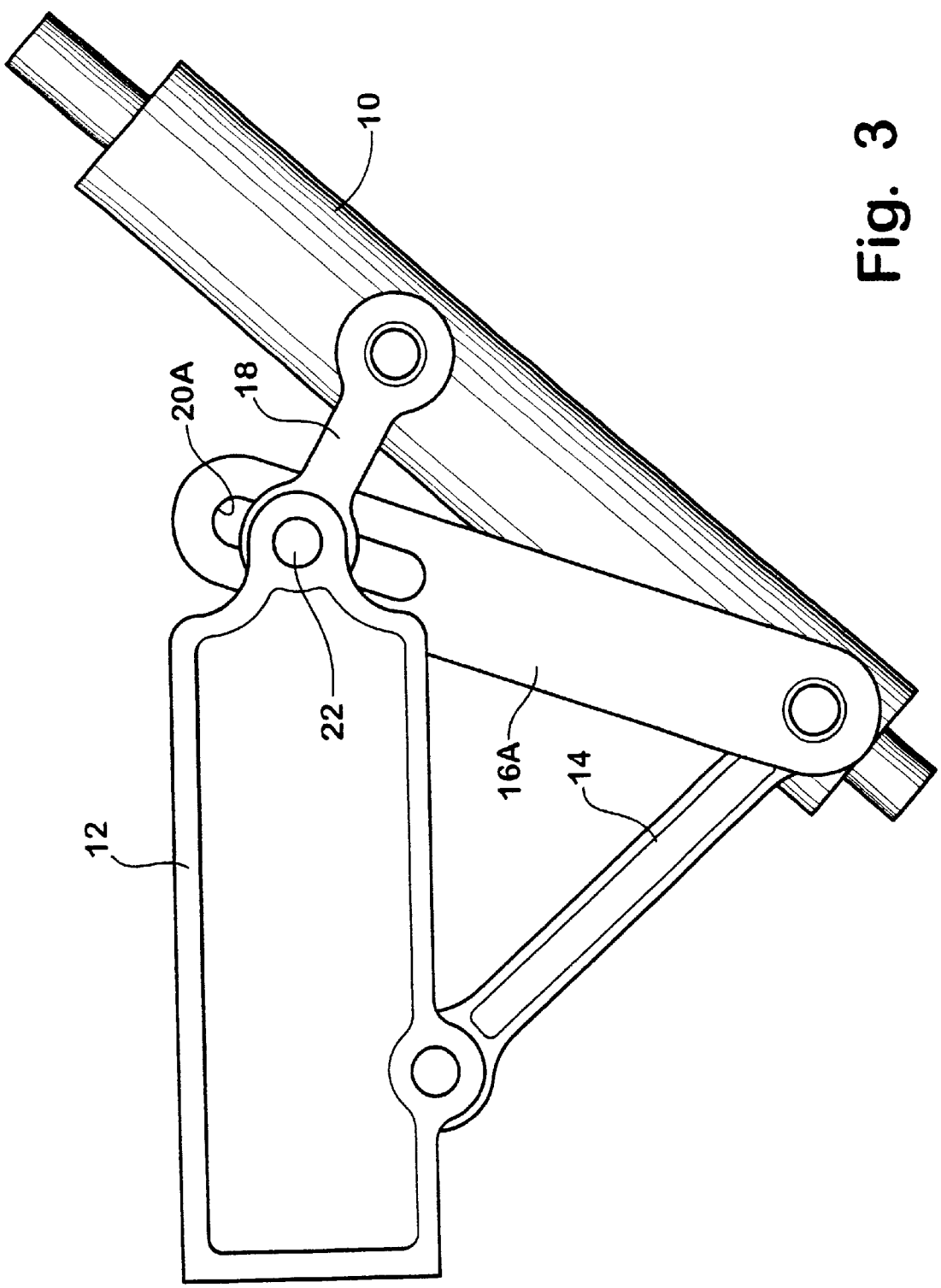
FIG. 3 is a side elevation of yet another form of a steering column support mechanism embodying the invention.

In yet a third embodiment, shown in FIG. 3, the steering column housing 10 is coupled to the stationary housing 12 by the first linkage plates 18 connected to the lower end of the column, a second linkage plates 16a interconnecting the lower end of the steering column housing 10 to the opposite end of the housing 12, and a third linkage plates 18 interconnecting the upper end of the column to the opposite end of the stationary housing 12. However, in this configuration, an elongate slot 20a is provided in the upper end of the second linkage plates 16a. Additionally, the third linkage plates 18 pivotally interconnects the upper portion of the steering column housing 10 to the end of the stationary housing 12 such that vertical movement of the linkage plates 16a results in a generally arcuate upward movement of the steering column housing 10, resulting in a longitudinal realignment of the steering column housing 10 in a telescoping fashion. Again, a locking assembly generally referenced as 22 frictionally fixes the relative position of the second linkage plates 16a with respect to the end of the housing to lock the column in position.

Figure 4:
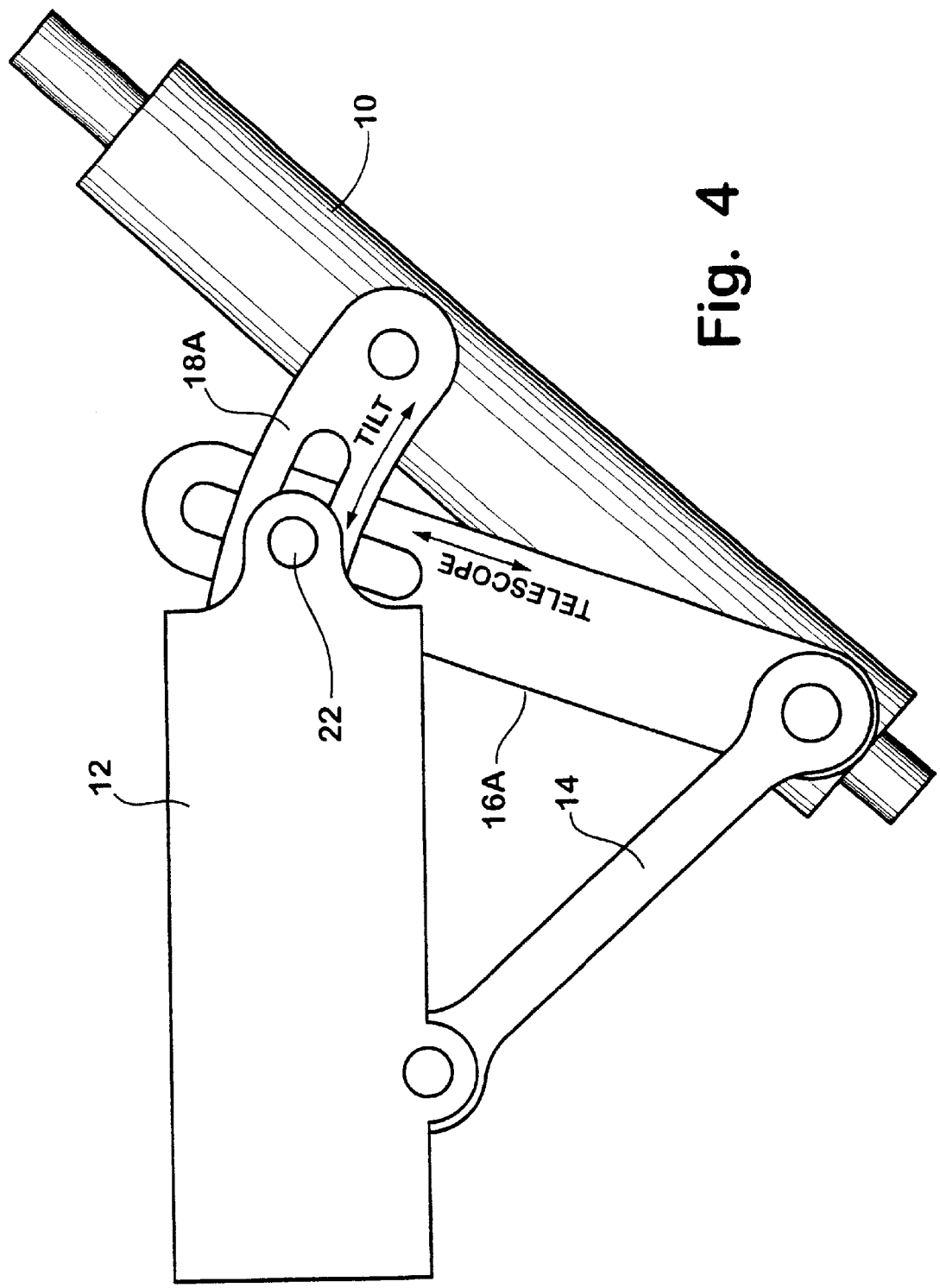
FIG. 4 is a side elevation of still another form of a steering column support mechanism embodying the invention.
Figure 5:
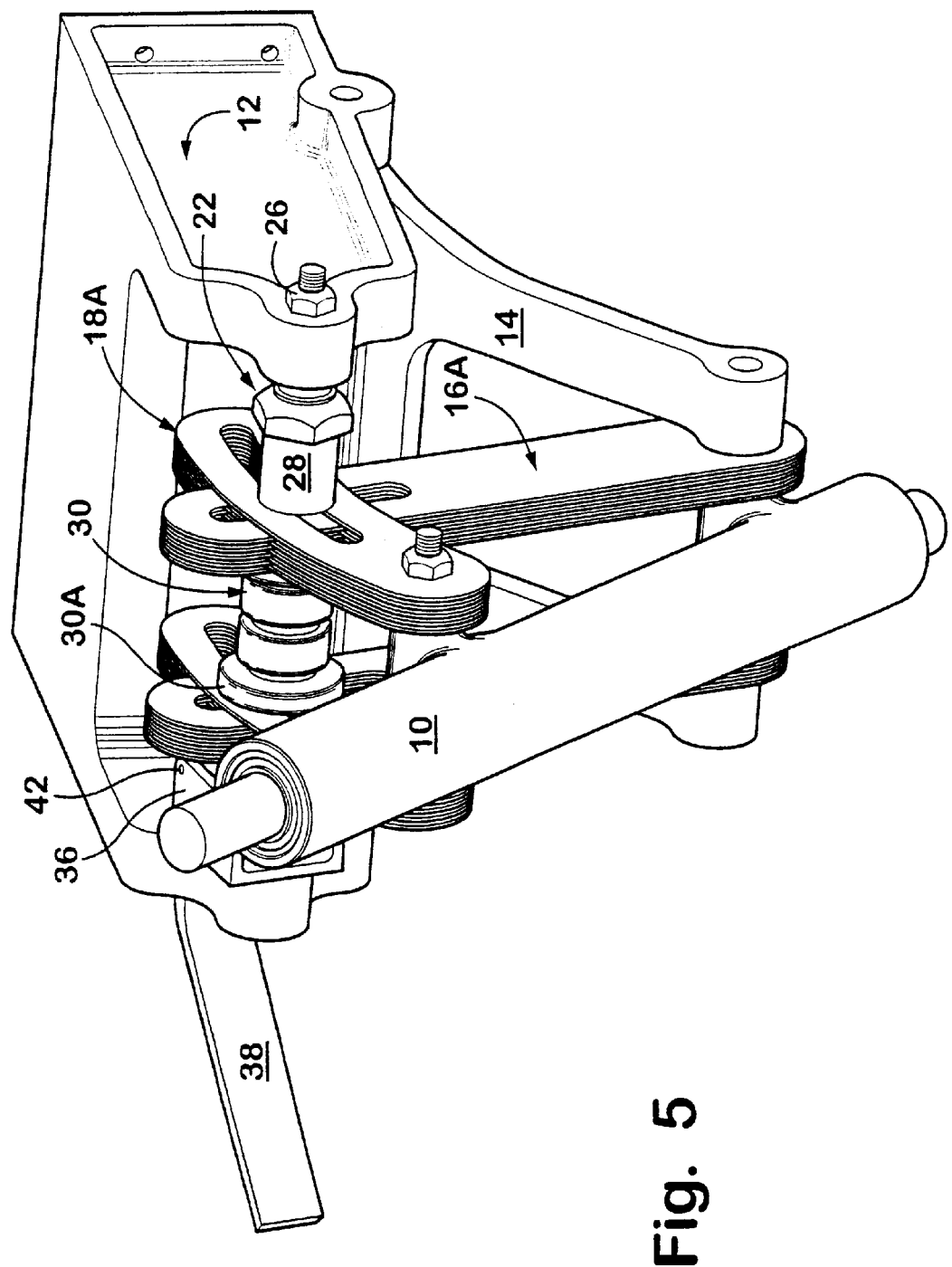
FIG. 5 is an isometric view of the right side of the steering column support mechanism shown in FIG. 3.

A tilting and telescoping version of the steering column is shown in FIGS. 4 and 5 wherein the steering column housing 10 is pivotally connected to the stationary housing 12 by the lower linkage plates 14 and adjustable linkages plates 16a and 18a, both having elongate slots which receive the locking assembly 22. When the locking assembly 22 is disengaged, the operator can adjust both the telescopic position, as well as the tilt position of the steering column housing 10.

FIG. 5 is an isometric view of the tilting telescope version of the steering column providing a better view of the locking assembly 22. Plainly illustrated in these figures, linkage plates 16a and 18a each include a plurality of plates, each having the elongate slots 20a formed therein and through which passes the locking assembly 22. The plates 16a and 18a are placed adjacent each other, or interleaved in an alternating relationship.

Figure 7:
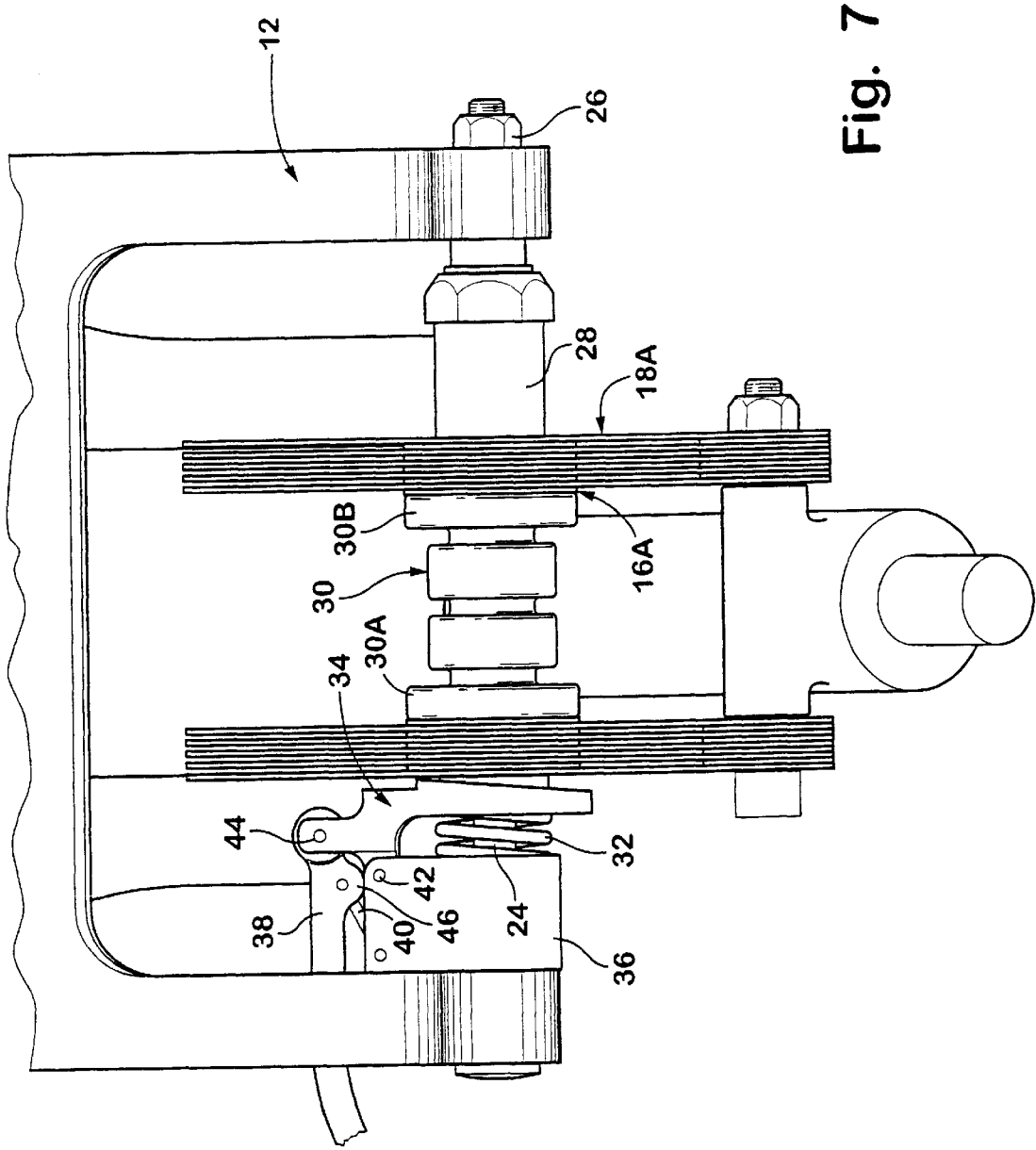
FIG. 7 is a plan view of a release mechanism used in the steering column support mechanism and in the open position.
Figure 8:
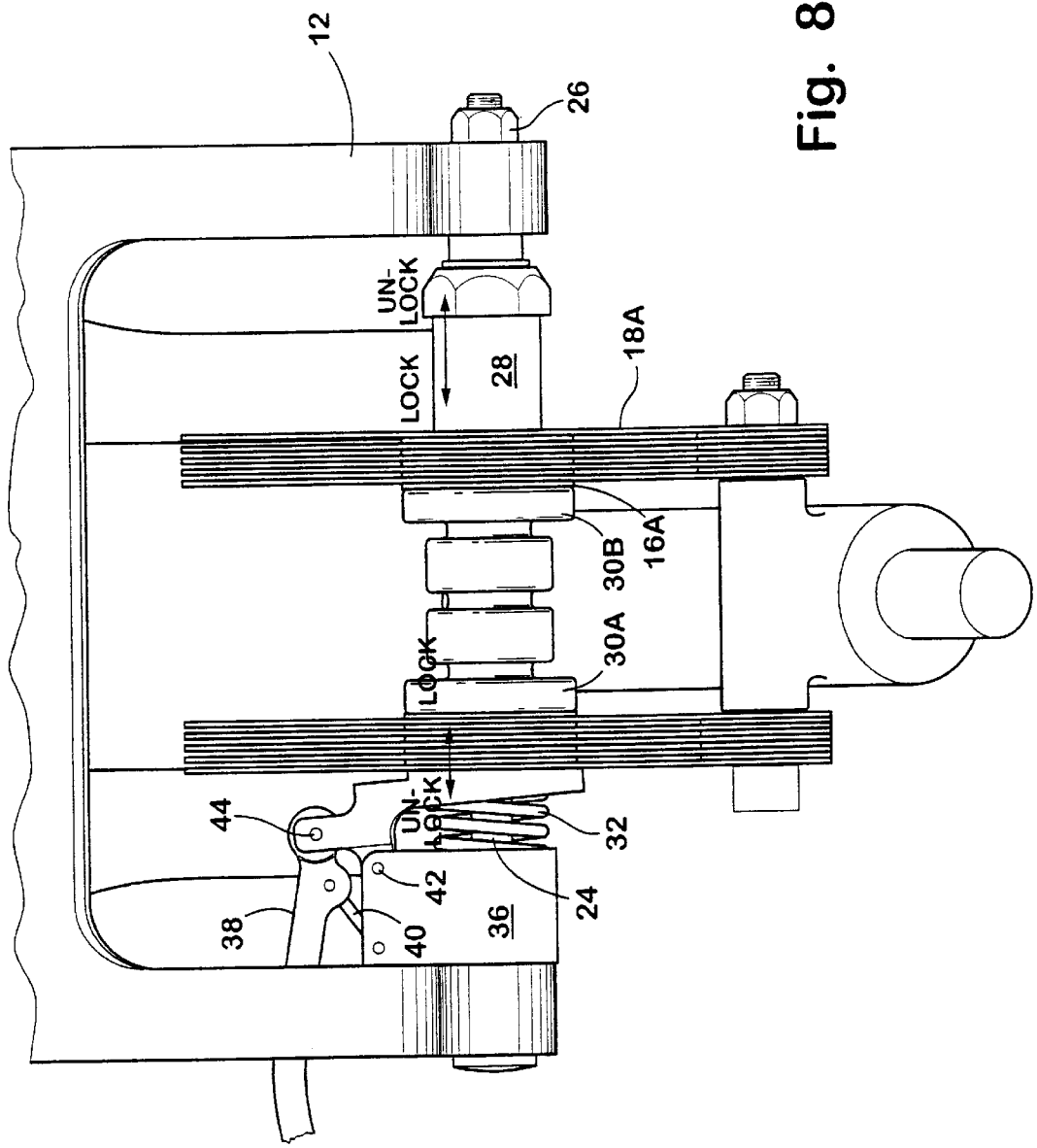
FIG. 8 is a plan view of the release mechanism shown in FIG. 7 and in the closed or locked position.

The locking assembly 22, best illustrated in FIGS. 7 and 8, includes a bolt 24 which extends between the flanges of the stationary housing 12 and is fixed by a nut 26. To one side of the right hand plates 16a and 18a is a spacer 28 which is positioned to the inside of the right hand flange and the right hand plates 16a and 18a. Intermediate the left hand and right hand plates 16a and 18a is a second spacer 30 having oppositely disposed end plates 30a and 30b configured to engage the inner portions of the plates 16a. To the left of the plates is a spring 32 coaxially received along the bolt 24 having a right end engaging one side of a pivotal clutch plate 34 pivotally attached by an ear portion to a bracket 36, which in turn, is attached to the left hand flange of the stationary housing 12. Pivotally coupled to an opposite end of the pivotal clutch plate 34 is a lever 38, which in turn, is interconnected to the bracket 36 by a linkage 40. The arrangement is such that when lever 38 is moved about the pivot point 44 and in cooperation with the linkage 40, moves the clutch plate about a pivot point defined by numeral 42 such that the clutch plate engages and disengages, selectively, the interleaved second and third plates 16a, 18a in compression to frictionally lock the plates 16a and 18a with respect to each other and with respect to the stationary housing 12. The lever mechanism for locking and unlocking the locking assembly 22 is designed such that when the lever is moved to an over-center position the force holds the lever in a desired configuration so the operator can use both hands to adjust the steering column. Once the operator has the steering column in the desired position, the operator simply moves the lever in the opposite direction to lock it in place.

Referring to FIG. 6, this figure illustrates a variable tilt and telescope version of the steering column. In all existing designs, a fixed tilt angle range is obtainable throughout the full telescopic range. In this particular design, a control plate 39 is placed adjacent linkage plates 16a and 18a. The control plate 39 allows for an infinite number of tilt angle control possibilities, such as when the column is fully collapsed, the operator can obtain +5° of tilt and a −3° of tilt, while at the fully extended position the column may have a +/−30° of tilt range available.

The basic invention is reflected in FIG. 1 wherein the steering column housing 10 is fixed with respect to the stationary housing 12 by essentially the three (3) linkage plates 14, 16, and 18 interconnecting a steering column housing 10 to the stationary housing 12. Modifications to the invention include the ability to adjust the steering column in the tilt direction by a slot in the linkage plates 18a, or in the vertical direction by a similar slot in the linkage plates 16a, or in both directions by the two linkage plates mentioned above. A second invention is the locking assembly for fixing the various positions of the linkage plates. A third invention is the variable concept illustrated in FIG. 6 to provide a range of tilt action depending on the telescopic movement. Lastly the use of an over center lever for holding the adjustable lever assembly in an open and locked configuration, particularly in use with adjustable steering columns is also considered to be novel.

The above description is considered that of the preferred embodiment only. Modifications of the invention will occur to those skilled in the art and to those who make or use the invention. Therefore, it is understood that the embodiment shown in these drawings and described herein are merely for illustrative purposes and not intended to limit the scope of the invention, which is defined by any claims in a subsequent or related application and interpreted according to the principals of patent law, including the doctrine of equivalence.

I claim:

1. A multi-bar linkage for a steering column, comprising:
   a stationary housing;
   a first link interconnecting a lower end of the steering column to a distal point on said stationary housing relative to the steering column;
   a second link interconnecting the lower end of the steering column to a proximal point on said stationary housing relative to the steering column; and
   a third link interconnecting an upper end of the steering column to said proximal point on said stationary housing.

2. The multi-bar linkage as defined in claim 1, further including a locking assembly extending through said stationary housing, an end of said second link, and an end of said third link for fixing a relative position of said first, second and third links relative to one another.

3. The multi-bar linkage as defined in claim 2, wherein said third link includes a longitudinal slot in an end coupled to said stationary housing, for allowing said third link to slide longitudinally relative to said stationary housing and change the steering column position relative to the stationary housing.

4. The multi-bar linkage as defined in claim 2, wherein said second link includes a longitudinal slot in an end coupled to said stationary housing, for allowing said second link to slide longitudinally relative to said stationary housing and change the steering column position relative to said stationary housing.

5. The multi-bar linkage as defined in claim 2, wherein said locking assembly includes:
   a bolt extending through said proximal point of said stationary housing and interconnecting said second and third links;
   a first spacer adjacent one of said second and third links and said stationary housing;
   a clutch plate adjacent an opposite one of said second and third links and said stationary housing;
   a biasing member disposed between said stationary housing and said clutch plate for urging said clutch plate against said opposite one of said second and third links and locking a relative position between said second and third links; and
   a lever attached to said clutch plate for moving said clutch plate away from said opposite one of said second and third links and unlocking said relative position between said second and third links.

6. The multi-bar linkage as defined in claim 3, wherein said third link includes a plurality of plates spaced from each other, each of said plurality of plates having an elongate slot aligned with an adjacent one of said plurality of plates to define said longitudinal slot.

7. The multi-bar linkage as defined in claim 3, wherein said second link includes a longitudinal slot in an end coupled to said stationary housing, for allowing said second link to slide longitudinally relative to said stationary housing and change the steering column position relative to said stationary housing.

8. The multi-bar linkage as defined in claim 4, wherein said second link includes a plurality of plates spaced from each other, each of said plurality of plates having an elongate slot aligned with an adjacent one of said plurality of plates to define said longitudinal slot.

9. The multi-bar linkage as defined in claim 6, wherein said second link includes a plurality of plates spaced from each other, each of said plurality of plates having an elongate slot aligned with an adjacent one of said plurality of plates to define said longitudinal slot.

10. The multi-bar linkage as defined in claim 9, wherein said plurality of plates forming said second link are interleaved with said plurality of plates forming said third link.

11. A support assembly for a steering column, comprising in combination:
    a housing having a first and second ends;
    a first plurality of linkage plates interconnecting a lower end of the steering column to a point intermediate said first and second ends of said housing;
    a second plurality of linkage plates interconnecting the lower end of the steering column to said first end of said housing;
    a third plurality of linkage plates interconnecting an upper end of the steering column to said first end of said housing; and
    a lock assembly extending through said first end of said housing and temporarily fixing a relative position between said first, second and third linkages so as to hold the steering column in position.

12. The support assembly as defined in claim 11, wherein said second plurality of linkage plates interconnecting the lower end of the steering column to said first end of said housing include a first end pivotally coupled to the lower end of the steering column, and a second end having an elongate slot coupled in sliding relationship between said third plurality of linkage plates and said locking assembly.

13. The support assembly as defined in claim 12, wherein said third plurality of linkage plates interconnecting the upper end of the steering column to said first end of said housing include a first end pivotally coupled to the upper end of the steering column, and a second end having an elongate slot coupled in sliding relationship between said second plurality of linkages plates and said locking assembly.

14. The support assembly as defined in claim 13, wherein said first end of said third plurality of linkage plates are interleaved with said first end of said second plurality of linkage plates.

15. The support assembly as defined in claim 14, wherein said lock assembly, includes:
    a bolt extending through said first end of said housing and through said interleaved second and third plurality of linkage plates;
    a spacer assembly received along said bolt and intermediate said housing and said interleaved second and third plurality of linkage plates;
    a clutch plate disposed between said housing and said interleaved second and third plurality of linkage plates;
    a spring urging said clutch plate against said interleaved second and third plurality of linkage plates and said spacer assembly locking the relative position between said second and third plurality of linkage plates; and
    a lever attached to said clutch plate for disengaging said clutch plate from said interleaved second and third plurality of linkage plates.

16. An steering column adjustment and support assembly, comprising:
    a stationary bracket assembly having spaced apart and parallel arms expending from a first end;
    a locking assembly interconnecting said spaced apart and parallel arms;
    a first link interconnecting an intermediate portion of said stationary bracket assembly to a lower portion of a steering column housing;
    a second link assembly interconnecting said lower portion of said steering column housing to said locking assembly, said second link assembly having an elongate slot at one end through which said locking assembly extends;
    a third link assembly interconnecting an upper portion of said steering column housing to said locking assembly, said second link assembly having an elongate slot at one end through which said locking assembly extends; and
    a control plate attached to at least one of said second and third link assemblies.

17. The steering column adjustment and support assembly as defined in claim 16, wherein said second link assembly and said third link assembly each include a plurality of linkage members.

18. The steering column adjustment and support assembly as defined in claim 17, wherein said one end of each of said second and third linkage members are interleaved along said locking assembly.

19. The steering column adjustment and support assembly as defined in claim 18, wherein said locking assembly, includes:
- a locking bolt extending between and interconnecting said spaced apart and parallel arms of said stationary bracket assembly;
- at least one spacer assembly intermediate said spaced apart and parallel arms of said stationary bracket assembly and received along said locking bolt;
- a clutch plate disposed between said at least one spacer and one of said spaced apart and parallel arms of said stationary bracket, and having said locking bolt extending there through; and
- a spring member clamping said clutch plate against said second and third linkage members sandwiched between said clutch plate and said at least one spacer.

20. The steering column adjustment and support assembly as defined in claim 18, wherein said control plate includes a central opening of predetermined dimension for limiting adjustment distances of said second and third linkage members.

* * * * *